US009256642B2

(12) United States Patent
Yu et al.

(10) Patent No.: US 9,256,642 B2
(45) Date of Patent: Feb. 9, 2016

(54) TECHNIQUES FOR RECOMMENDING PARALLEL EXECUTION OF SQL STATEMENTS

(75) Inventors: Hailing Yu, San Jose, CA (US); Peter Belknap, Redwood City, CA (US); Thierry Cruanes, Foster City, CA (US); Benoit Dageville, Truckee, CA (US); Karl Dias, Foster City, CA (US); Khaled Yagoub, Newark, CA (US)

(73) Assignee: Oracle International Corporation, Redwood Shores, CA (US)

( * ) Notice: Subject to any disclaimer, the term of this patent is extended or adjusted under 35 U.S.C. 154(b) by 393 days.

(21) Appl. No.: 12/827,926

(22) Filed: Jun. 30, 2010

(65) Prior Publication Data

US 2012/0005188 A1    Jan. 5, 2012

(51) Int. Cl.
*G06F 7/00*    (2006.01)
*G06F 17/30*    (2006.01)

(52) U.S. Cl.
CPC ................ *G06F 17/30445* (2013.01)

(58) Field of Classification Search
CPC .................................. G06F 17/30445
USPC ........................ 707/713, 718, 764
See application file for complete search history.

(56) References Cited

U.S. PATENT DOCUMENTS

| | | | |
|---|---|---|---|
| 6,957,211 B1 * | 10/2005 | Tyulenev et al. | 707/718 |
| 7,499,909 B2 | 3/2009 | Liu et al. | |
| 8,688,689 B2 | 4/2014 | Yu et al. | |
| 2004/0122845 A1 * | 6/2004 | Lohman et al. | 707/102 |
| 2005/0125393 A1 | 6/2005 | Yagoub et al. | |
| 2006/0080285 A1 * | 4/2006 | Chowdhuri | 707/3 |
| 2007/0067274 A1 | 3/2007 | Han et al. | |
| 2009/0100004 A1 | 4/2009 | Andrei et al. | |
| 2009/0172544 A1 | 7/2009 | Tsui et al. | |
| 2010/0198810 A1 * | 8/2010 | Graefe et al. | 707/718 |
| 2012/0005189 A1 | 1/2012 | Yu et al. | |

OTHER PUBLICATIONS

Kyte, T., Expert Oracle Database Architecture 9i and 10g Programming Techniques and Solutions, A-Press, 2005, pp. 615-648.*
Taniar et al., High-Performance Parallel Database Processing and Grid Databases, John Wiley & Sons, Inc. pp. 256-287, 2008.*
U.S. Appl. No. 12/827,943, filed Jun. 30, 2010, Yu et al.

(Continued)

*Primary Examiner* — Cheyne D Ly
(74) *Attorney, Agent, or Firm* — Kilpatrick Townsend & Stockton LLP

(57) ABSTRACT

Techniques for automatically recommending parallel execution of a SQL statement. In one set of embodiments, a first determination can be made regarding whether a SQL statement can be executed in parallel. Further, a second determination can be made regarding whether executing the SQL statement in parallel is faster than executing the statement in serial by a predetermined factor. If the first determination and second determination are positive (i.e., the statement can be executed in parallel and parallel execution is faster by the predetermined factor), a recommendation can be provided indicating that the SQL statement should be executed in parallel. In some embodiments, the recommendation can include a report specifying the degree of performance improvement gained from parallel execution, additional system resources consumed by parallel execution, and other statistics pertaining to the recommended parallel execution plan.

18 Claims, 8 Drawing Sheets

(56) References Cited

OTHER PUBLICATIONS

Non-Final Office Action for U.S. Appl. No. 12/827,943, mailed on Jan. 20, 2012, 12 pages.
Non-Final Office Action for U.S. Appl. No. 12/827,943, mailed on Jan. 20, 2012, 13 pages.
Final Office Action mailed on Jun. 28, 2012 for U.S. Appl. No. 12/827,943, 14 pages.
Notice of Allowance mailed on Nov. 12, 2013 for U.S. Appl. No. 12/897,943, 20 pages.

* cited by examiner

TECHNIQUES FOR RECOMMENDING PARALLEL EXECUTION OF SQL STATEMENTS

CROSS-REFERENCES TO RELATED APPLICATIONS

The present disclosure is related to the following commonly assigned, co-pending U.S. Patent Application, which is incorporated herein by reference in its entirety for all purposes: application Ser. No. 12/827,943, filed concurrently with the present application, entitled "TECHNIQUES FOR RECOMMENDING ALTERNATIVE SQL EXECUTION PLANS."

BACKGROUND OF THE INVENTION

Embodiments of the present invention relate to in general to databases, and in particular to techniques for aiding a user in tuning database performance by recommending parallel execution of SQL statements.

Several current relational database management systems (RDBMSs) support the parallel execution of SQL statements. Generally speaking, when a SQL statement is executed in parallel by a database server, the work necessary for running the statement is divided among two or more processes or microprocessors (e.g., CPUs) of the server. This can, in some instances, significantly reduce the execution elapsed time (and thus, response time) for the statement when compared with serial execution.

However, not all SQL statements are well-suited for parallel execution. Parallel processing has a performance overhead, which can in turn affect a database server's throughput and the response time of other concurrent statements/queries. Thus, for certain SQL statements and certain contexts, parallel execution can have an ineffective (or even detrimental) performance impact. Unfortunately, there is currently no automated mechanism for aiding a user (e.g., a database administrator (DBA)) in determining whether a particular SQL statement can benefit from being run in parallel.

BRIEF SUMMARY OF THE INVENTION

Embodiments of the present invention provide techniques for automatically recommending parallel execution of a SQL statement. In one set of embodiments, a first determination can be made regarding whether a SQL statement can be executed in parallel. Further, a second determination can be made regarding whether executing the SQL statement in parallel is faster than executing the statement in serial by a predetermined factor. If the first determination and second determination are positive (i.e., the statement can be executed in parallel and parallel execution is faster by the predetermined factor), a recommendation can be provided indicating that the SQL statement should be executed in parallel. In some embodiments, the recommendation can include a report specifying the degree of performance improvement gained from parallel execution, additional system resources consumed by parallel execution, and other statistics pertaining to the recommended parallel execution plan.

According to one embodiment of the present invention, a method is provided that includes determining, by a computer system, whether a SQL statement can be executed in parallel, and determining, by the computer system, whether executing the SQL statement in parallel is faster by a predetermined factor than executing the SQL statement in serial (i.e., using a single processing resource). If the SQL statement can be executed in parallel and if executing the SQL statement in parallel is faster by the predetermined factor than executing the SQL statement in serial, the method further includes providing, by the computer system to a user, a recommendation indicating that the SQL statement should be executed in parallel.

In one embodiment, determining whether the SQL statement can be executed in parallel includes determining a number of Central Processing Units (CPUs) in the computer system and determining whether the number of CPUs exceeds a predefined number.

In one embodiment, determining whether the SQL statement can be executed in parallel further includes determining whether the SQL statement is already configured to be executed in parallel.

In one embodiment, determining whether the SQL statement can be executed in parallel further includes determining whether the SQL statement is a data definition language (DDL) statement or a data manipulation language (DML) statement.

In one embodiment, determining whether executing the SQL statement in parallel is faster by the predetermined factor than executing the SQL statement in serial includes determining a first cost for executing the SQL statement in parallel, determining a first response time based on the first cost, determining a second cost for executing the SQL statement in serial, determining a second response time based on the second cost, and determining whether the first response time is lower than the second response time by the predetermined factor.

In one embodiment, the first and second costs are determined using a cost-based SQL optimizer.

In one embodiment, providing a recommendation indicating that the SQL statement should be executed in parallel includes generating a parallel SQL profile for the SQL statement and recommending that the parallel SQL profile be stored.

In one embodiment, providing a recommendation indicating that the SQL statement should be executed in parallel further includes generating a report including a plurality of statistics adapted to aid the user in determining whether to accept the recommendation.

In one embodiment, the plurality of statistics include a total number of executions of the SQL statement by the computer system over a historical time period, total database time consumed by executing the SQL statement over the historical time period, and an estimated amount of database time that will be consumed by executing the SQL statement in parallel over a future time period.

In one embodiment, the plurality of statistics further include an amount of response time improvement achieved by executing the SQL statement in parallel, and an amount of resource overhead incurred by executing the SQL statement in parallel.

According to another embodiment of the present invention, a computer-readable storage medium have stored thereon program code executable by a computer system is provided. The program code includes code that causes the computer system to determine whether a SQL statement can be executed in parallel and code that causes the computer system to determine whether executing the SQL statement in parallel is faster by a predetermined factor than executing the SQL statement in serial. The program code further includes code that causes the computer system to provide a recommendation to a user indicating that the SQL statement should be executed in parallel if the SQL statement can be executed in parallel and if executing the SQL statement in parallel is faster by the predetermined factor than executing the SQL statement in serial.

According to another embodiment of the present invention, a computer system is provided. The computer system includes a processor configured to determine whether a SQL statement can be executed in parallel, determine whether executing the SQL statement in parallel is faster by a predetermined factor than executing the SQL statement in serial. If the SQL statement can be executed in parallel and if executing the SQL statement in parallel is faster by the predetermined factor than executing the SQL statement in serial, the processor is further configured to provide a recommendation indicating that the SQL statement should be executed in parallel.

A further understanding of the nature and advantages of the embodiments disclosed herein can be realized by reference to the remaining portions of the specification and the attached drawings.

DETAILED DESCRIPTION OF THE INVENTION

In the following description, for the purposes of explanation, numerous details are set forth in order to provide an understanding of embodiments of the present invention. It will be apparent, however, to one of ordinary skill in the art that certain embodiments can be practiced without some of these details.

Embodiments of the present invention provide techniques for automatically recommending parallel execution of a SQL statement. In one set of embodiments, a first determination can be made regarding whether a SQL statement can be executed in parallel. Further, a second determination can be made regarding whether executing the SQL statement in parallel is faster than executing the statement in serial by a predetermined factor. If the first determination and second determination are positive (i.e., the statement can be executed in parallel and parallel execution is faster by the predetermined factor), a recommendation can be provided indicating that the SQL statement should be executed in parallel. In some embodiments, the recommendation can include a report specifying the degree of performance improvement gained from parallel execution, additional system resources consumed by parallel execution, and other statistics pertaining to the recommended parallel execution plan.

Figure 1:
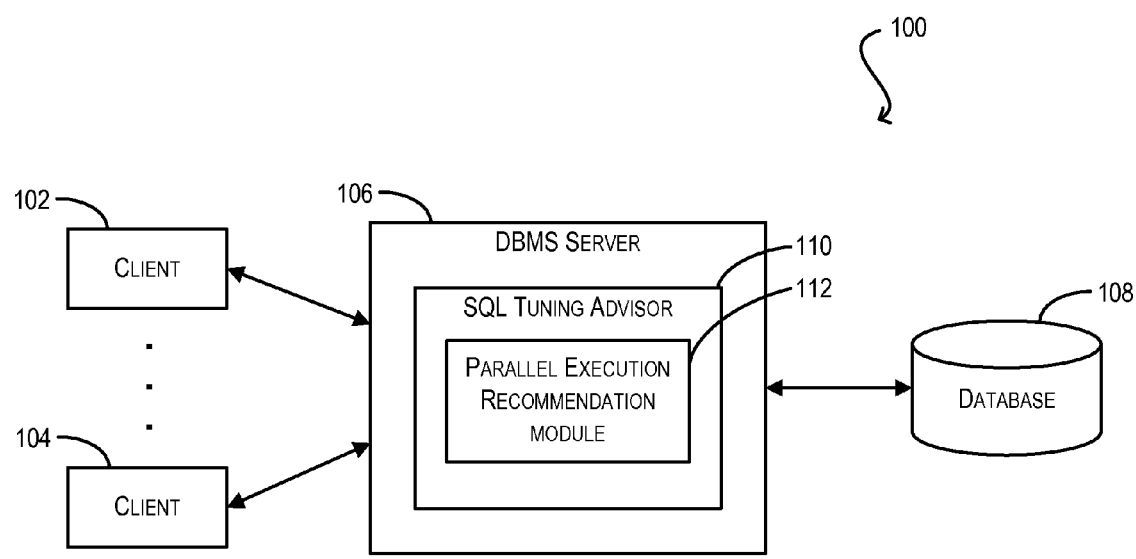
FIG. 1 is a simplified block diagram illustrating a system in accordance with an embodiment of the present invention.

FIG. 1 is a simplified block diagram illustrating a system 100 according to an embodiment of the present invention. As shown, system 100 can include one or more clients 102, 104 that are communicatively coupled with a database server 106. Database server 106 can be a software and/or hardware based component that provides services and access to a data store such as database 108. Examples of database servers can include, for instance, those commercially available from Oracle, Microsoft, Sybase, and IBM. In one set of embodiments, database server 106 and database 108 can be components of a relational database management system (RDBMS), such as Oracle 11g, that is adapted to store, update, and retrieve data in response to SQL-formatted commands. Although database server 106 and database 108 are shown as separate entities in system 100, one of ordinary skill in the art will appreciate that server 106 and database 108 can be resident on a single physical machine or separate physical machines.

In certain embodiments, database server 106 can include a SQL tuning advisor 110. SQL tuning advisor 110 can be a software and/or hardware-based tool that is adapted to provide recommendations to a user (e.g., a DBA) on how to improve the performance of SQL statements executed by database server 106. For example, a DBA operating client 102 or 104 can access database server 106 (e.g., via a graphical or command-line based interface) and can invoke SQL tuning advisor 110 with respect to a poorly-performing SQL statement. SQL tuning advisor can then carrying out one or more processing steps to determine the cause of the SQL statement's poor performance and provide recommendations to the DBA on how to improve that performance. An example of such as advisor is the SQL Tuning Advisor included in Oracle 11 g.

In one set of embodiments, SQL tuning advisor 110 can include a number of modules, where each module is configured to analyze a particular aspect of SQL performance. For example, SQL tuning advisor 110 can include a module that is configured to analyze the statistics associated with database objects, a module that is configured to determine the existence of database indexes, a module that is configured to identify ways in which an execution plan can be restructured, and so on. When SQL tuning advisor 110 is invoked, each of these modules can be executed in turn on a poorly performing SQL statement to determine a number of different ways in which performance can be improved.

In a particular set of embodiments, SQL tuning advisor 110 can include a parallel execution recommendation module 112 (in addition to zero or more other modules as described above). As discussed in the Background section, when a SQL statement is executed in parallel by a database server, the execution time (and thus, the response time) for the statement can be significantly improved when compared to serial execution. For instance, performance can be improved via parallel execution if, e.g., the SQL statement is long-running and requires data-intensive operations.

However, not all SQL statements are well-suited for parallel execution. For example, in some cases, the performance overhead or loss in system throughput that is associated with parallel processing can cause a particular SQL statement to run no better (or worse) in parallel mode than in serial mode. Thus, users/administrators of the database system can have a difficult time in determine when parallel execution should be enabled and when it should be disabled.

To address this, parallel execution recommendation module 112 can provide an automated mechanism for determining whether parallel execution should be used for a particular SQL statement and for providing an appropriate recommendation to a user. For instance, a DBA operating client 102 or 104 can invoke SQL tuning advisor 110 and can request a parallel execution recommendation with respect to a poorly-performing SQL statement. In response, SQL tuning advisor 110 can invoke parallel execution recommendation module 112, which can automatically perform various processing steps to determine whether parallel execution would sufficiently improve the performance of the statement. Parallel execution recommendation module 112 can then generate a recommendation for the DBA indicating whether parallel execution should or should not be used. The specific processing performed by parallel execution recommendation module 112 is discussed in greater detail below.

It should be appreciated that system 100 of FIG. 1 is illustrative and not intended to limit embodiments of the present invention. For example, the various entities depicted in system 100 can have other capabilities or include other components that are not specifically described. One of ordinary skill in the art will recognize many variations, modifications, and alternatives.

Figure 2:
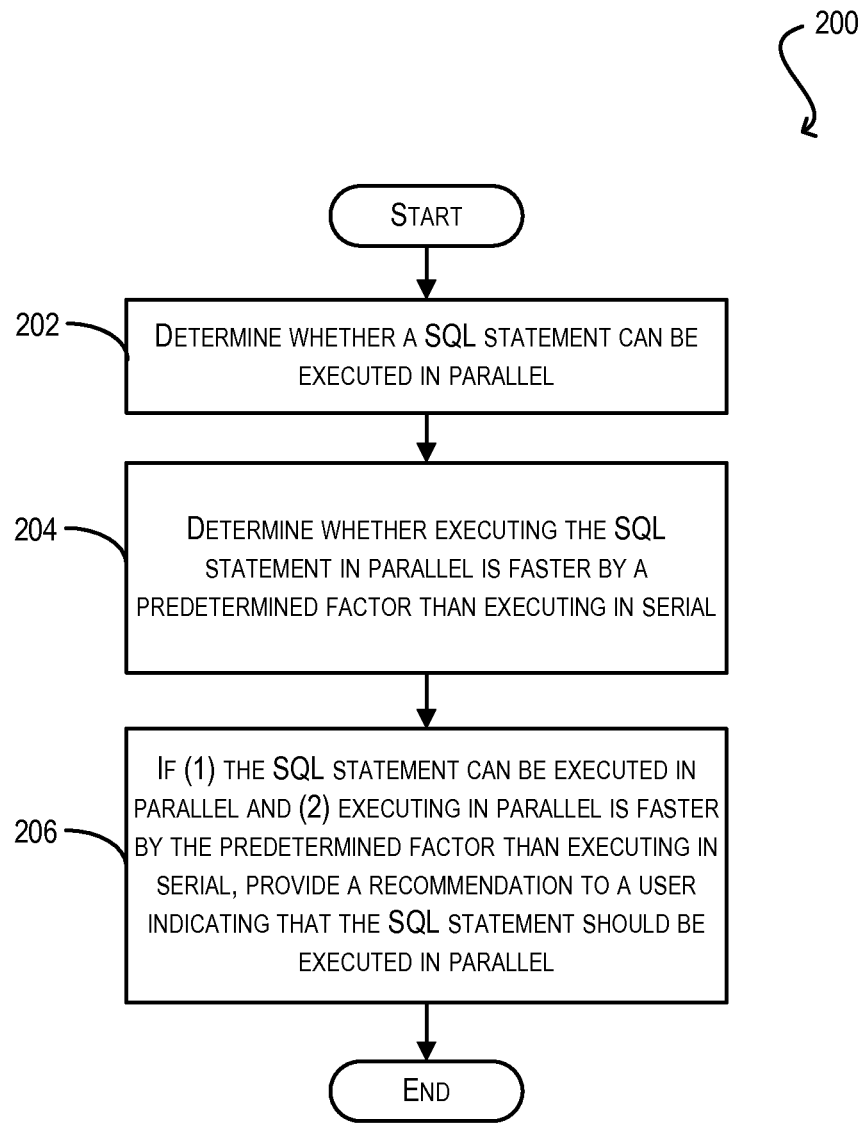
FIG. 2 is a flow diagram illustrating a process for recommending parallel execution of a SQL statement in accordance with an embodiment of the present invention.

FIG. 2 is a flow diagram illustrating a process 200 for recommending parallel execution of a SQL statement according to an embodiment of the present invention. In one set of embodiments, process 200 can be carried out by parallel execution recommendation module 112 of FIG. 1. Process 200 can be implemented in hardware, software, or a combination thereof. As software, process 200 can be encoded as program code stored on a machine-readable storage medium.

At block 202, module 112 can determine whether a given SQL statement can be executed in parallel. In other words, module 112 can determine whether parallel execution of the statement is possible/appropriate in view of, e.g., the statement itself, the physical configuration of the server executing the statement, the current execution context, and/or other factors.

Figure 3:
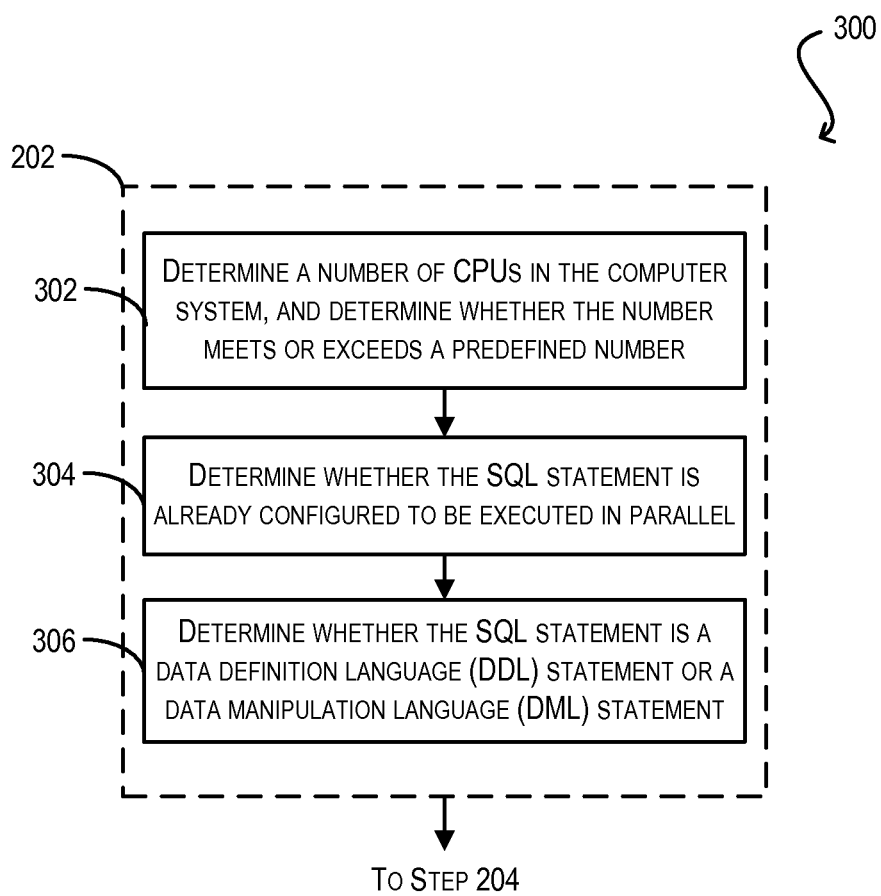
FIG. 3 is a flow diagram illustrating a process for determining whether a SQL statement can be executed in parallel in accordance with an embodiment of the present invention.

FIG. 3 illustrates a process 300 that can be executed by module 112 as part of the processing of block 202. As shown in FIG. 3, module 112 can determine a number of CPUs in database server 106 and determine whether that number meets or exceeds a predefined number (block 302). If the number of CPUs is less than the predefined number, module 112 can determine that parallel execution of the SQL statement is not appropriate or not possible. If the number of CPUs meets and/or exceeds the predefined number, module 112 can determine that the processor configuration of the server is not an obstacle to parallel execution. For example, the predefined number can be set at two, three, four, or higher. In various embodiments, the predefined number can be specified by an administrator or other user responsible for managing the operation of SQL tuning advisor 110 and/or parallel execution recommendation module 112.

At block 304, module 112 can determine whether the SQL statement is already configured to be executed in parallel. If the statement is already being executed in parallel, there is no need to recommend parallel execution to an end-user. In one set of embodiments, this determination can be performed by checking where there already exists a SQL profile associated with the statement that enables parallel execution.

At block 306, module 112 can determine whether the SQL statement is a data definition language (DDL) statement or a data manipulation language (DML) statement. Examples of DDL statements include "CREATE," "DROP," and "ALTER." Examples of DML statements include "SELECT," "UPDATE," "INSERT INTO," and "DELETE FROM." In certain embodiments, parallel execution of DDL statements can be less beneficial that parallel execution of DML statements. Accordingly, in these embodiments, module 112 can determine that parallel execution is not appropriate or not possible if the SQL statement is a DDL statement. Conversely, module 112 can determine that parallel execution is appropriate/possible if the SQL statement is a DML statement.

In further embodiments, module 112 can perform a more granular filter based on whether the SQL statement is a particular type of DDL or DML statement. For instance, module 112 can determine that parallel execution is not appropriate or not possible for a certain type of DDL/DML statement, and yet determine that parallel execution is appropriate/possible for a different type of DDL/DML statement.

It should be appreciated that process 300 is illustrative and that variations and modifications are possible. Steps described as sequential can be executed in parallel, order of steps can be varied, and steps can be modified, combined, added, or omitted. One of ordinary skill in the art would recognize many variations, modifications, and alternatives.

Returning to FIG. 2, once module 112 has determined that parallel execution of the SQL statement is possible, module 112 can determine whether executing the statement in parallel is faster by a predetermined factor that executing the statement in serial (block 204). As discussed above, for certain SQL statements and certain contexts, parallel execution may not be significantly faster than serial execution. Accordingly, the processing at block 204 ensures that parallel execution provides a sufficient performance improvement (i.e., is faster by at least the predetermined factor) before a recommendation is made to enable it. In various embodiments, the predetermined factor can be specified by an administrator or other user responsible for managing the operation of SQL tuning advisor 110 and/or parallel execution recommendation module 112.

Figure 4:
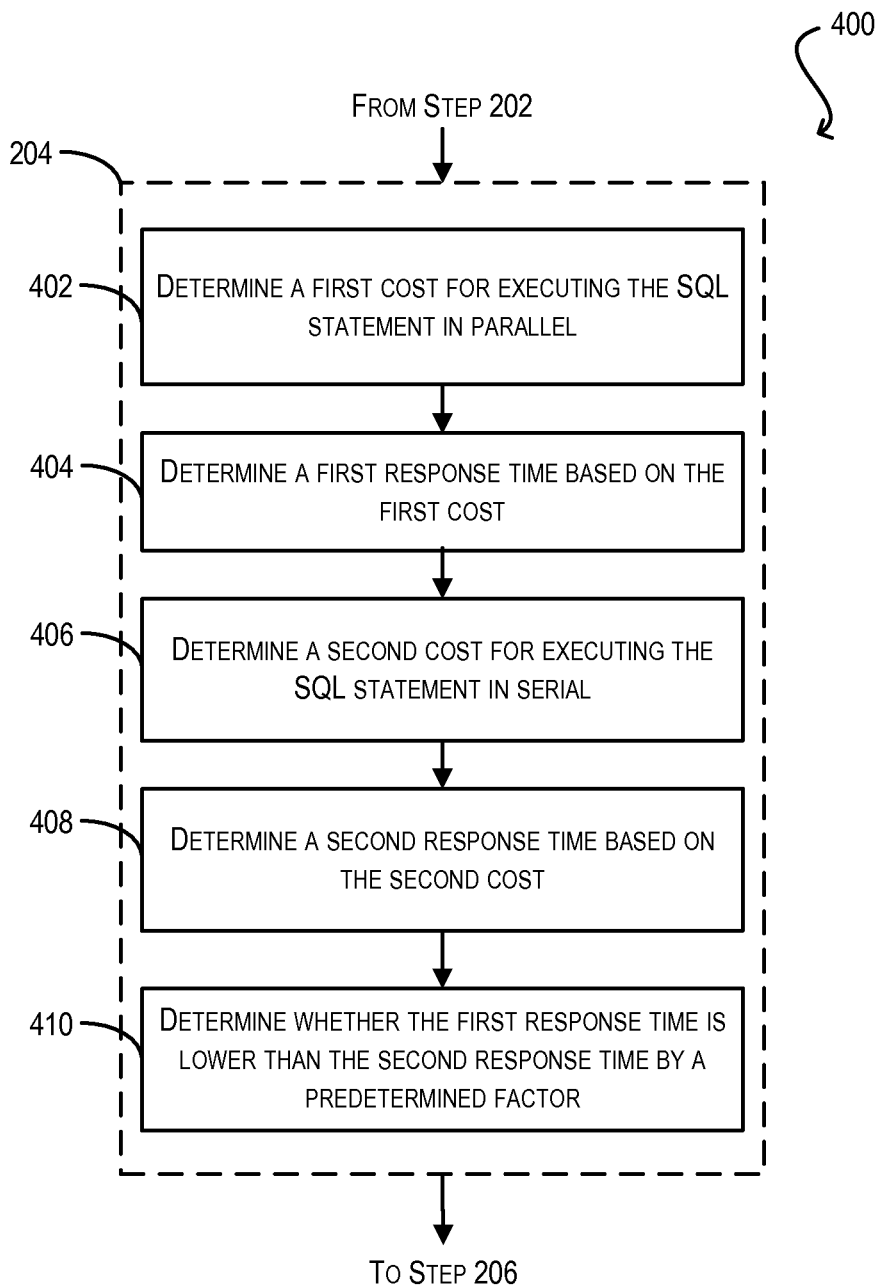
FIG. 4 is a flow diagram illustrating a process for determining whether executing a SQL statement in parallel is faster than executing the SQL statement in serial in accordance with an embodiment of the present invention.

FIG. 4 illustrates a process 400 that can be executed by module 112 as part of the processing of block 204. As shown in FIG. 4, module 112 can determine a first cost for executing the SQL statement in parallel (block 402). In one set of embodiments, this first cost can be determined via a SQL cost-based optimizer such as the optimizer found in Oracle 11 g. At block 404, a first response time can be determined based on the first cost.

Module 112 can then determine a second cost for executing the SQL statement in serial (i.e., using a single CPU or processing resource) (block 406). Like the first cost, the second cost can be determined via a SQL cost-based optimizer. At block 408, a second response time can be determined based on the second cost.

Once the first and second response times are determined, module 112 can compare the two response times and determine whether the first response time is lower than the second response time by the predetermined factor (block 410). If the first response time is lower by the predetermined factor, module 112 can determine that parallel execution provides a sufficient performance improvement over serial execution to warrant a parallel execution recommendation. If the first response time is not lower by the predetermined factor, module 112 can determine that parallel execution does not provide a sufficient performance improvement and thus should not be recommended.

It should be appreciated that process 400 is illustrative and that variations and modifications are possible. Steps described as sequential can be executed in parallel, order of steps can be varied, and steps can be modified, combined, added, or omitted. For example, in one set of embodiments blocks 404, 408 can be removed, and the first and second costs can be directly compared at block 410. One of ordinary skill in the art would recognize many variations, modifications, and alternatives.

Returning to FIG. 2, (1) if the SQL statement can be executed in parallel (as determined at block 202), and (2) if executing in parallel is faster by the predetermined factor than executing in serial (as determined at block 204), module 112 can generate a recommendation for a user indicating that the SQL statement should be executed in parallel (block 206). Conversely, if (1) the SQL statement cannot be executed in parallel (as determined at block 202), or (2) if executing in parallel is not faster by the predetermined factor than executing in serial (as determined at block 204), module 112 can generate a message for the user indicating that the SQL statement would not benefit from parallel execution. As described with respect to FIGS. 5 and 6 below, generating a parallel execution recommendation can include providing to the user a simple mechanism for enabling parallelism for the SQL statement, as well as generating a user interface that provides information (e.g., statistics) about the recommended parallel execution plan.

It should be appreciated that process 200 is illustrative and that variations and modifications are possible. Steps described as sequential can be executed in parallel, order of steps can be varied, and steps can be modified, combined, added, or omitted. One of ordinary skill in the art would recognize many variations, modifications, and alternatives.

Figure 5:
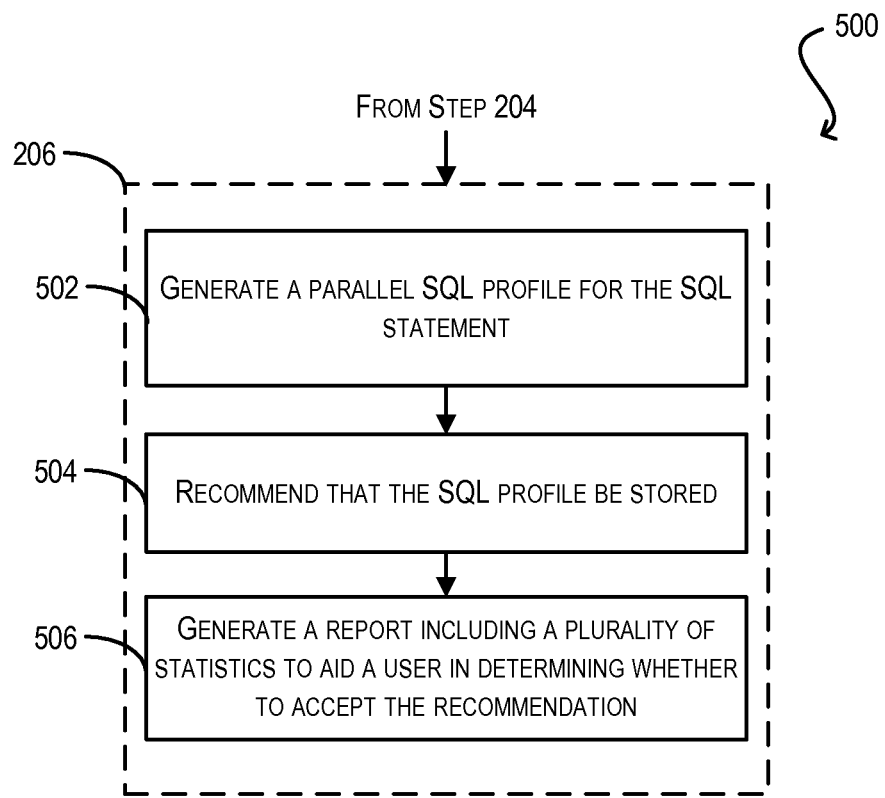
FIG. 5 is a flow diagram illustrating a process for providing a parallel execution recommendation in accordance with an embodiment of the present invention.

FIG. 5 is a flow diagram illustrating a process 500 for generating a parallel execution recommendation according to an embodiment of the present invention. In one set of embodiments, process 500 can be carried out by parallel execution recommendation module 112 as part of the processing of block 206 of FIG. 2. Process 500 can be implemented in hardware, software, or a combination thereof. As software, process 500 can be encoded as program code stored on a machine-readable storage medium.

At steps 502 and 504, module 112 can generate a parallel SQL profile for the SQL statement and can recommend to the user that the profile be stored. As used herein, a parallel SQL profile is a piece of data that indicates that a particular SQL statement is to be run in parallel. When the SQL statement is executed, a runtime SQL optimizer can determine whether a parallel SQL profile is stored for the statement and, if so, the statement can be run in parallel. Thus, by storing the generated profile, the user can easily enable parallel execution for the statement.

Figure 6:
FIG. 6 is a example report than can be generated in accordance with an embodiment of the present invention.

At step 506, module 112 can generate a report that includes information about the recommended parallel execution plan. This information can include, e.g., the recommended degree of parallelism (DOP), the response time improvement when running in parallel, and the resource consumption overhead when running in parallel. The report can also include sampled statistics for the SQL statement over a historical time period (e.g., number of prior executions, percent of total activity, total DB time, etc.) and projected statistics for the SQL statement over a future time period when run in parallel. FIG. 6 illustrates an example of such a report (600) that shows sampled statistics over the past week and projected statistics for the next week. Using this information, the user (e.g., DBA) can make an informed decision on whether to accept (or not accept) the parallel execution recommendation.

It should be appreciated that process 500 is illustrative and that variations and modifications are possible. Steps described as sequential can be executed in parallel, order of steps can be varied, and steps can be modified, combined, added, or omitted. One of ordinary skill in the art would recognize many variations, modifications, and alternatives.

Figure 7:
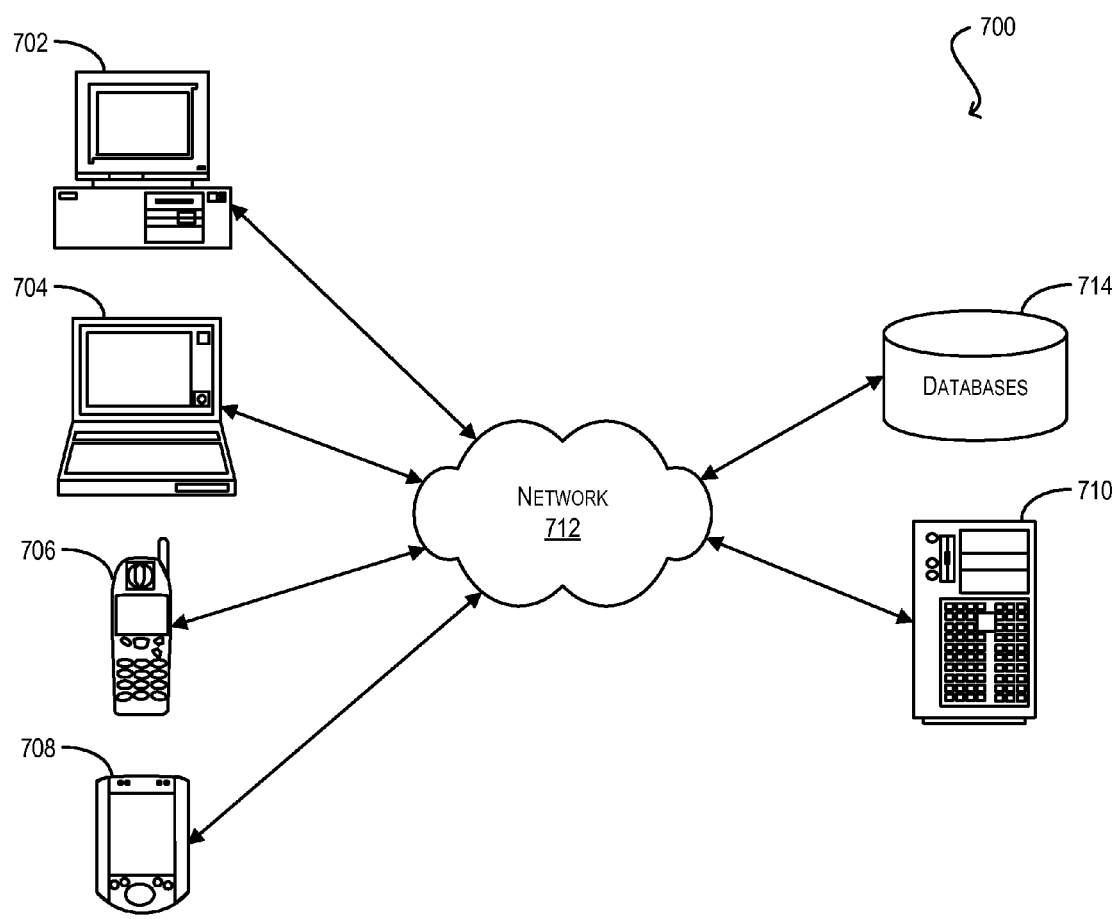
FIG. 7 is a simplified block diagram illustrating a system environment that can be used in accordance with an embodiment of the present invention.

FIG. 7 is a simplified block diagram illustrating a system environment 700 that can be used in accordance with an embodiment of the present invention. As shown, system environment 700 can include one or more client computing devices 702, 704, 706, 708, which can be configured to operate a client application such as a web browser, a UNIX/Solaris terminal application, and/or the like. In various embodiments, client computing devices 702, 704, 706, 708 can correspond to clients 102, 104 of FIG. 1, and can be operated by one or more users to invoke and interact with SQL tuning advisor 110 and/or parallel execution recommendation module 112.

Client computing devices 702, 704, 706, 708 can be general purpose personal computers (e.g., personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 702, 704, 706, 708 can be any other electronic device capable of communicating over a network, such as network 712 described below. Although system environment 700 is shown with four client computing devices, it should be appreciated that any number of client computing devices can be supported.

System environment 700 can further include a network 712. Network 712 can be any type of network familiar to those skilled in the art that can support data communications using a network protocol, such as TCP/IP, SNA, IPX, AppleTalk, and the like. Merely by way of example, network 712 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 700 can further include one or more server computers 710 which can be general purpose computers, specialized server computers (including, e.g., PC servers, UNIX servers, mid-range servers, mainframe computers, rack-mounted servers, etc.), server farms, server clusters, or any other appropriate arrangement and/or combination. Server 710 can run an operating system including any of those discussed above, as well as any commercially available server operating system. Server 710 can also run any of a variety of server applications and/or mid-tier applications, including web servers, FTP servers, CGI servers, Java virtual machines, and the like. In one set of embodiments, server 710 can run a database server application such as database server 106 of FIG. 1.

System environment 700 can further include one or more databases 714. In one set of embodiments, databases 714 can include databases that are managed by server 710 (e.g., database 108 of FIG. 1). Databases 714 can reside in a variety of locations. By way of example, databases 714 can reside on a storage medium local to (and/or resident in) one or more of computers 702, 704, 706, 708, and 710. Alternatively, databases 714 can be remote from any or all of computers **702, 704, 706, 708, and 710, and/or in communication (e.g., via network 712) with one or more of these. In one set of embodiments, databases 714 can reside in a storage-area network (SAN) familiar to those skilled in the art.

Figure 8:
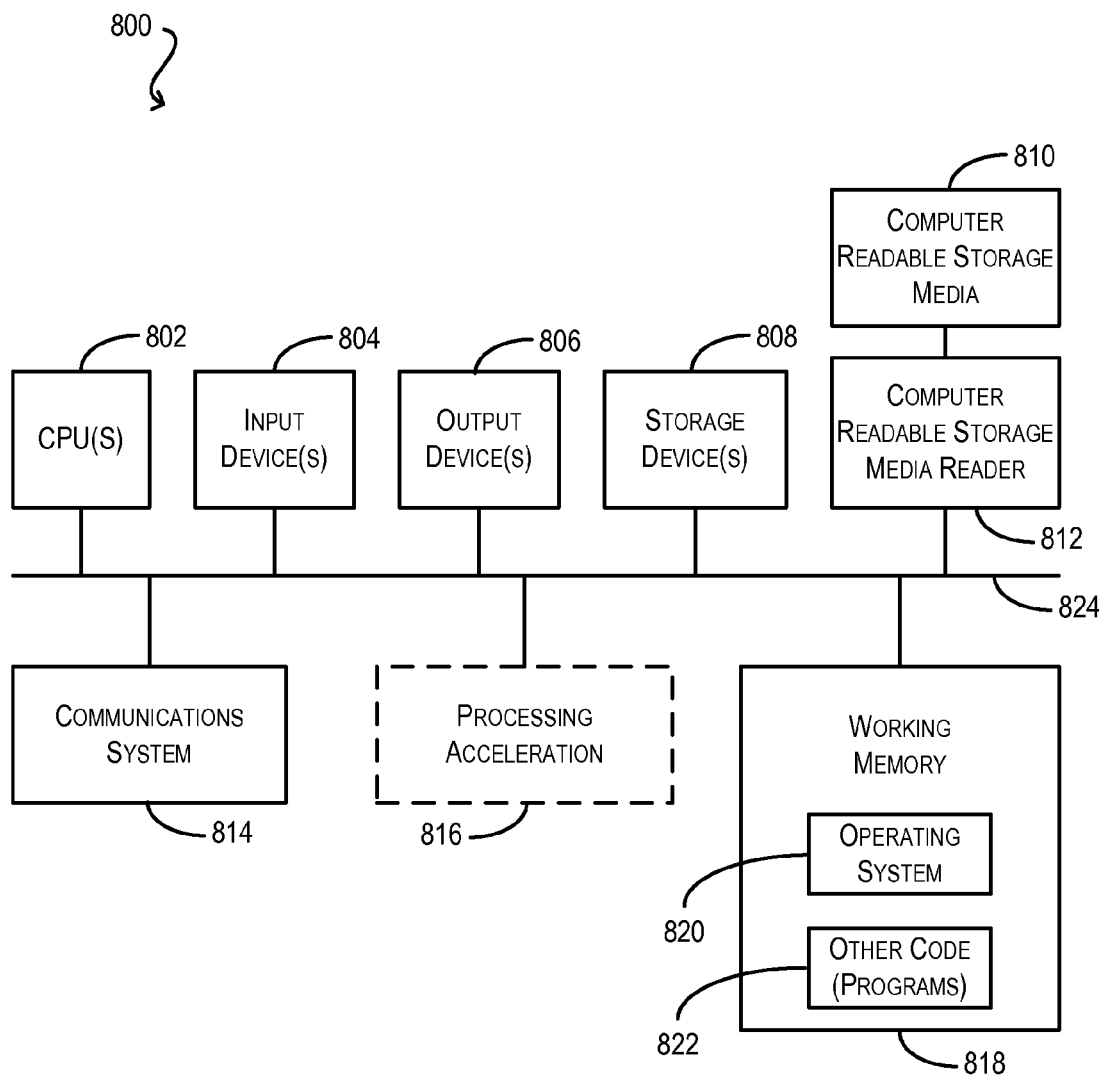
FIG. 8 is a simplified block diagram illustrating a computer system that can be used in accordance with an embodiment of the present invention.

FIG. 8 is a simplified block diagram illustrating a computer system 800 that can be used in accordance with an embodiment of the present invention. In various embodiments, computer system 800 can be used to implement any of computers 702, 704, 706, 708, and 710 described with respect to system environment 700 above. As shown, computer system 800 can include hardware elements that are electrically coupled via a bus 824. The hardware elements can include one or more central processing units (CPUs) 802, one or more input devices 804 (e.g., a mouse, a keyboard, etc.), and one or more output devices 806 (e.g., a display device, a printer, etc.). Computer system 800 can also include one or more storage devices 808. By way of example, the storage device(s) 808 can include devices such as disk drives, optical storage devices, and solid-state storage devices such as a random access memory (RAM) and/or a read-only memory (ROM), which can be programmable, flash-updateable and/or the like.

Computer system 800 can additionally include a computer-readable storage media reader 812, a communications subsystem 814 (e.g., a modem, a network card (wireless or wired), an infra-red communication device, etc.), and working memory 818, which can include RAM and ROM devices as described above. In some embodiments, computer system 800 can also include a processing acceleration unit 816, which can include a digital signal processor (DSP), a special-purpose processor, and/or the like.

Computer-readable storage media reader 812 can be connected to a computer-readable storage medium 810, together (and, optionally, in combination with storage device(s) 808) comprehensively representing remote, local, fixed, and/or removable storage devices plus storage media for temporarily and/or more permanently containing computer-readable information. Communications system 814 can permit data to be exchanged with network 712 and/or any other computer described above with respect to system environment 700.

Computer system 800 can also comprise software elements, shown as being currently located within working memory 818, including an operating system 820 and/or other code 822, such as an application program (which may be a client application, Web browser, middle tier/server application, etc.). It should be appreciated that alternative embodiments of computer system 800 can have numerous variations from that described above. For example, customized hardware can be used and particular elements can be implemented in hardware, software, or both. Further, connection to other computing devices such as network input/output devices can be employed.

Computer readable storage media for containing code, or portions of code, executable by computer system 800 can include any appropriate media known or used in the art, such as but not limited to volatile/non-volatile and removable/non-removable media. Examples of computer-readable storage media include RAM, ROM, EEPROM, flash memory, CD-ROM, digital versatile disk (DVD) or other optical storage, magnetic cassettes, magnetic tape, magnetic disk storage or other magnetic storage devices, an any other medium that can be used to store data and/or program code and that can be accessed by a computer.

Although specific embodiments of the invention have been described above, various modifications, alterations, alternative constructions, and equivalents are within the scope of the invention. For example, the techniques described above are not limited to recommending parallel execution of SQL-formatted statements; rather, they can be used to recommend parallel execution for any type of database query language statement. Further, although embodiments of the present invention have been described with respect to certain flow diagrams and steps, it should be apparent to those skilled in the art that the scope of the present invention is not limited to the described diagrams/steps.

Yet further, although embodiments of the present invention have been described using a particular combination of hardware and software, it should be recognized that other combinations of hardware and software are also within the scope of the present invention.

The specification and drawings are, accordingly, to be regarded in an illustrative rather than restrictive sense. It will be evident that additions, subtractions, and other modifications may be made thereunto without departing from the broader spirit and scope of the invention as set forth in the following claims.

What is claimed is:

1. A method comprising:
    analyzing, by a database server in a computer system, a SQL statement's performance;
    determining, by the database server, whether the SQL statement can be executed in parallel by two or more processing resources;
    determining, by the database server, whether executing the SQL statement in parallel is faster by a predetermined factor than executing the SQL statement serially, wherein the determining further comprises determining a first response time for executing the SQL statement in parallel and a second response time for executing the SQL statement serially, wherein executing the SQL statement in parallel is faster by the predetermined factor than executing the SQL statement serially if the first response time is lower than the second response time by the predetermined factor;
    if the database server determines that the SQL statement can be executed in parallel and that executing the SQL statement in parallel is faster by the predetermined factor than executing the SQL statement serially, providing, by the database server, a recommendation indicating an improvement in the SQL statement's performance if the SQL statement were to be executed in parallel;
    if the database server determines that the SQL statement cannot be executed in parallel or that executing the SQL statement in parallel is not faster by the predetermined factor than executing the SQL statement serially, providing, by the database server, a recommendation indicating that the SQL statement's performance is not improved by the predetermined factor if the SQL statement were to be executed in parallel;
    receiving, by the database server, an input in response to the recommendation wherein the input accepts or rejects the recommendation, wherein the input is received from an external source outside the database server; and
    generating a statement-specific parallel profile associated with the SQL statement based on the recommendation, wherein the statement-specific parallel profile is used at runtime to determine whether the SQL statement is to be executed in parallel.

2. The method of claim 1 wherein determining whether the SQL statement can be executed in parallel comprises:
    determining a number of Central Processing Units (CPUs) in the computer system; and
    determining whether the number of CPUs exceeds a predefined number.

3. The method of claim 2 wherein determining whether the SQL statement can be executed in parallel further comprises determining whether the SQL statement is already configured to be executed in parallel.

4. The method of claim 3 wherein determining whether the SQL statement can be executed in parallel further comprises determining whether the SQL statement is a data definition language (DDL) statement or a data manipulation language (DML) statement.

5. The method of claim 1 wherein determining whether executing the SQL statement in parallel is faster by the predetermined factor than executing the SQL statement serially comprises:
   determining a first cost for executing the SQL statement in parallel;
   determining a first response time based on the first cost;
   determining a second cost for executing the SQL statement serially;
   determining a second response time based on the second cost; and
   determining whether the first response time is lower than the second response time by the predetermined factor.

6. The method of claim 5 wherein the first and second costs are determined using a cost-based SQL optimizer.

7. The method of claim 1 further comprising:
   recommending that the statement-specific parallel profile be stored.

8. The method of claim 7 wherein providing a recommendation further comprises:
   generating a report including a plurality of statistics to be used in determining whether to execute the SQL statement in parallel based on the recommendation.

9. The method of claim 8 wherein the plurality of statistics include a total number of executions of the SQL statement by the computer system over a historical time period, total database time consumed by executing the SQL statement over the historical time period, and an estimated amount of database time that will be consumed by executing the SQL statement in parallel over a future time period.

10. The method of claim 1 wherein the recommendation further indicates an amount of response time improvement achieved if the SQL statement were to be executed in parallel, and an amount of resource overhead incurred if the SQL statement were to be executed parallel.

11. A non-transitory computer-readable storage medium having stored thereon program code executable by a computer system, the program code comprising:
   code that causes the computer system to analyze a SQL statement's performance;
   code that causes the computer system to determine whether the SQL statement can be executed in parallel by two or more processing resources;
   code that causes the computer system to determine whether executing the SQL statement in parallel is faster by a predetermined factor than executing the SQL statement serially, wherein the determining further comprises determining a first response time for executing the SQL statement in parallel and a second response time for executing the SQL statement serially, wherein executing the SQL statement in parallel is faster by the predetermined factor than executing the SQL statement serially if the first response time is lower than the second response time by the predetermined factor;
   code that causes the computer system to, if the computer system determines that the SQL statement can be executed in parallel and that executing the SQL statement in parallel is faster by a predetermined factor than executing the SQL statement serially, provide a recommendation indicating an improvement in the SQL statement's performance if the SQL statement were to be executed in parallel;
   code that causes the computer system to, if the computer system determines that the SQL statement cannot be executed in parallel or that executing the SQL statement in parallel is not faster by the predetermined factor than executing the SQL statement serially, provide a recommendation indicating that the SQL statement's performance is not improved by the predetermined factor if the SQL statement were to be executed in parallel;
   code that causes the computer system to receive an input in response to the recommendation, wherein the input accepts or rejects the recommendation, wherein the input is received from an external source outside the computer system; and
   code that causes the computer system to generate a statement-specific parallel profile associated with the SQL statement based on the recommendation, wherein the statement-specific parallel profile is used at runtime to determine whether the SQL statement is to be executed in parallel.

12. The computer-readable storage medium of claim 11 wherein the code that causes the computer system to determine whether executing the SQL statement in parallel is faster by the predetermined factor than executing the SQL statement serially comprises:
   code that causes the computer system to determine a first cost for executing the SQL statement in parallel;
   code that causes the computer system to determine a first response time based on the first cost;
   code that causes the computer system to determine a second cost for executing the SQL statement serially;
   code that causes the computer system to determine a second response time based on the second cost; and
   code that causes the computer system to determine whether the first response time is lower than the second response time by the predetermined factor.

13. The computer-readable storage medium of claim 11 further comprising:
   code that causes the computer system to recommend that the statement-specific parallel profile be stored.

14. The computer-readable storage medium of claim 13 wherein the code that causes the computer system to provide a recommendation further comprises:
   code that causes the computer system to generate a report including a plurality of statistics to be used in determining whether to execute the SQL statement in parallel based on the recommendation.

15. A computer system comprising:
   a processor configured to:
   analyze a SQL statement's performance;
   determine whether a SQL statement can be executed in parallel by two or more processing resources;
   determine whether executing the SQL statement in parallel is faster by a predetermined factor than executing the SQL statement serially, wherein the predetermined factor is specific to the SQL statement, wherein the determining further comprises determining a first response time for executing the SQL statement in parallel and a second response time for executing the SQL statement serially, wherein executing the SQL statement in parallel is faster by the predetermined factor than executing the SQL statement serially if the first response time is lower than the second response time by the predetermined factor;

if the processor determines that the SQL statement can be executed in parallel and that executing the SQL statement in parallel is faster by the predetermined factor than executing the SQL statement serially, provide a recommendation indicating an improvement in the SQL statement's performance if the SQL statement were to be executed in parallel;

if the processor determines that the SQL statement cannot be executed in parallel or that executing the SQL statement in parallel is not faster by the predetermined factor than executing the SQL statement serially, provide a recommendation indicating that the SQL statement's performance is not improved by the predetermined factor if the SQL statement were to be executed in parallel;

receive an input in response to the recommendation wherein the input accepts or rejects the recommendation, wherein the input is received from an external source outside the database server; and generate a statement-specific parallel profile associated with the SQL statement based on the recommendation, wherein the statement-specific parallel profile is used at runtime to determine whether the SQL statement is to be executed in parallel.

16. The computer system of claim 15 wherein determining whether executing the SQL statement in parallel is faster by the predetermined factor than executing the SQL statement serially comprises:
  determining a first cost for executing the SQL statement in parallel;
  determining a first response time based on the first cost;
  determining a second cost for executing the SQL statement serially;
  determining a second response time based on the second cost; and
  determining whether the first response time is lower than the second response time by the predetermined factor.

17. The computer system of claim 15 further comprising:
  recommending that the statement-specific parallel profile be stored.

18. The computer system of claim 17 wherein providing a recommendation further comprises:
  generating a report including a plurality of statistics to be used in determining whether to execute the SQL statement in parallel based on the recommendation.

* * * * *